US012781714B2

(12) United States Patent
Chen et al.

(10) Patent No.: US 12,781,714 B2
(45) Date of Patent: Nov. 3, 2026

(54) SLOPE TYPE GRAVITY ENERGY STORAGE TRANSMISSION DEVICE

(71) Applicant: Guizhou Power Grid Co., Ltd., Guiyang (CN)

(72) Inventors: Julong Chen, Guiyang (CN); Bin Wang, Guiyang (CN); Zhen Li, Guiyang (CN); Yongqing Zhu, Guiyang (CN); Xuepeng Mou, Guiyang (CN); Xueyong Tang, Guiyang (CN); Yuxiang Wang, Guiyang (CN); Dameng Liu, Guiyang (CN); Qingsheng Li, Guiyang (CN); Bin Hu, Guiyang (CN); Yu Zhang, Guiyang (CN); Jierui Yang, Guiyang (CN); Zhaofeng Zhang, Guiyang (CN)

( * ) Notice: Subject to any disclaimer, the term of this patent is extended or adjusted under 35 U.S.C. 154(b) by 77 days.

(21) Appl. No.: 19/009,143

(22) Filed: Jan. 3, 2025

(65) Prior Publication Data

US 2026/0049597 A1 Feb. 19, 2026

Related U.S. Application Data

(63) Continuation of application No. PCT/CN2024/135958, filed on Nov. 29, 2024.

(30) Foreign Application Priority Data

Aug. 19, 2024 (CN) ........................ 202411135265.2

(51) Int. Cl.
*F03G 3/00* (2006.01)
*F16H 7/06* (2006.01)

(52) U.S. Cl.
CPC .............. *F03G 3/094* (2021.08); *F16H 7/06* (2013.01)

(58) Field of Classification Search
CPC ............ F03G 3/087; F03G 3/094; F16H 7/06
See application file for complete search history.

(56) References Cited

FOREIGN PATENT DOCUMENTS

| | | | | |
|---|---|---|---|---|
| CN | 113653612 A | * 11/2021 | ................ | H02J 3/28 |
| CN | 115450871 A | * 12/2022 | ............. | F03G 3/087 |
| CN | 117329094 A | * 1/2024 | ............. | F03G 3/094 |
| CN | 118419501 A | * 8/2024 | ............. | B65G 35/00 |

* cited by examiner

*Primary Examiner* — Phillip A Johnson

(57) ABSTRACT

A slope type gravity energy storage transmission device, including: a chain, provided with a lower gentle area, an ascending area and an upper gentle area; a connecting mechanism, including a connecting base, a locking frame slidingly, and a fastening plate; and an abutting mechanism, including a fixed plate and an inserting frame. According to the present invention, in the process of lifting a flexible trolley, the fastening plate is in a locked state without causing the separation of the inserting frame, so the separation phenomenon can be avoided, and the potential safety hazard can be reduced.

10 Claims, 6 Drawing Sheets

SLOPE TYPE GRAVITY ENERGY STORAGE TRANSMISSION DEVICE

CROSS-REFERENCE TO RELATED APPLICATIONS

The present application claims priority to Chinese Patent Application No. 2024111352652, filed on Aug. 19, 2024, the entire disclosure of which is incorporated herein by reference.

TECHNICAL FIELD

The present invention relates to the technical field of gravity energy storage, and in particular to a slope type gravity energy storage transmission device.

BACKGROUND

Slope type gravity energy storage is a technology that uses a slope terrain to store and release energy by ascending and descending heavy objects. The core principle of the energy storage mode is to convert electric energy into gravitational potential energy of heavy objects and then convert the gravitational potential energy back to electric energy when necessary.

A slope type gravity energy storage transmission device is usually a steel cable or a chain, a connecting structure for connecting or clamping a flexible trolley is arranged on the steel cable or chain, an energy storage mass block is arranged above the flexible trolley, the transmission device is arranged in a groove of an energy storage platform, and when the transmission device is in operation, the trolley located at a lower position can be clamped, is conveyed to a higher position with the operation of the transmission device and finally is separated at the higher position to store the gravitational potential energy.

The trolley and the transmission device are connected in a clamping mode. Although the conveying efficiency of the energy storage mass block and the energy storage efficiency can be improved, there is a risk of the separation of the trolley, with a certain potential safety hazard, so a slope type gravity energy storage transmission device is proposed.

SUMMARY

The present invention is provided in view of the above problem or the problem in the prior art that there is a risk of the separation of a trolley connected in a clamping mode.

Therefore, an objective of the present invention is to provide a slope type gravity energy storage transmission device.

To solve the above technical problem, the present invention provides the following technical solution: a slope type gravity energy storage transmission device includes: a chain, provided with a lower gentle area, an ascending area and an upper gentle area; a connecting mechanism, including a connecting base arranged on the chain and a locking frame slidingly arranged on the connecting base, and further including a fastening plate movably connected to the connecting base; and an abutting mechanism, including a fixed plate and an inserting frame arranged on the fixed plate. A deflectable direction of the fastening plate can be controlled by controlling a sliding direction of the locking frame.

As a preferred solution of the slope type gravity energy storage transmission device according to the present invention, a first semi-arc groove and a second semi-arc groove are formed in the connecting base; a first locking rod and a second locking rod are arranged on the locking frame; and protrusion portions are arranged at two ends of the fastening plate, and a first clamping shaft and a second clamping shaft are arranged on the fastening plate.

As a preferred solution of the slope type gravity energy storage transmission device according to the present invention, the connecting mechanism further includes a limiting frame fixedly arranged on the connecting base and a side sliding plate slidingly arranged on the limiting frame, where an oblique push groove and a limiting groove are formed in the side sliding plate, and a spring is arranged in the limiting groove; and a push column is arranged on the locking frame, and an outer wall of the push column is slidingly connected to an inner wall of the oblique push groove.

As a preferred solution of the slope type gravity energy storage transmission device according to the present invention, the slope type gravity energy storage transmission device further includes an opening top plate, where the opening top plate includes a lower top plate and an oblique push surface arranged on the lower top plate; and a lower abutting surface is arranged on the side sliding plate.

As a preferred solution of the slope type gravity energy storage transmission device according to the present invention, the slope type gravity energy storage transmission device further includes a separating top rod, where the separating top rod includes an upper push rod and an upper top surface arranged on the upper push rod; and an upper abutting surface is arranged on the side sliding plate.

As a preferred solution of the slope type gravity energy storage transmission device according to the present invention, an upper push surface is arranged on the fastening plate.

As a preferred solution of the slope type gravity energy storage transmission device according to the present invention, a separating surface is arranged on the fastening plate.

As a preferred solution of the slope type gravity energy storage transmission device according to the present invention, a pushing surface is arranged on the fastening plate.

As a preferred solution of the slope type gravity energy storage transmission device according to the present invention, a reset groove is formed in the upper push rod, and a length of the second clamping shaft is greater than that of the first clamping shaft.

As a preferred solution of the slope type gravity energy storage transmission device according to the present invention, a first shaft and a second shaft are arranged on the chain; a connecting frame is arranged on the connecting base, and a connecting groove is formed in the connecting frame; and the first shaft and the second shaft are slidingly arranged in the connecting groove.

The slope type gravity energy storage transmission device according to the present invention has the following beneficial effects: according to the present invention, the inserting frame is clamped by the fastening plate, and in the process of lifting the flexible trolley, the fastening plate is in the locked state without causing the separation of the inserting frame, so the separation phenomenon can be avoided, and the potential safety hazard can be reduced.

BRIEF DESCRIPTION OF DRAWINGS

To more clearly describe the technical solutions of the embodiments of the present invention, the accompanying drawings required to describe the embodiments are briefly described below. Apparently, the accompanying drawings described below are only some embodiments of the present invention. Those skilled in the art may further obtain other drawings based on these accompanying drawings without inventive effort.

DETAILED DESCRIPTION OF THE EMBODIMENTS

To make the described objectives, features and advantages of the present invention more obvious and more understandable, the specific embodiments of the present invention are described in detail below in conjunction with the accompanying drawings.

A number of specific details are set forth in the description below to provide a thorough understanding for the present invention, however, the present invention may also be implemented in other manners different from those described herein, and those skilled in the art may make similar generalization without departing from the essence of the present invention; therefore, the present invention is not limited by the specific embodiments disclosed below.

Secondly, "one embodiment" or "embodiment" referred to herein refers to a specific feature, structure, or characteristic that may be included in at least one implementation manner of the present invention. The "in one embodiment" appearing in different parts of the present specification does not necessarily refer to the same embodiment, nor a separate or selective embodiment that is mutually exclusive to other embodiments.

Figure 1:
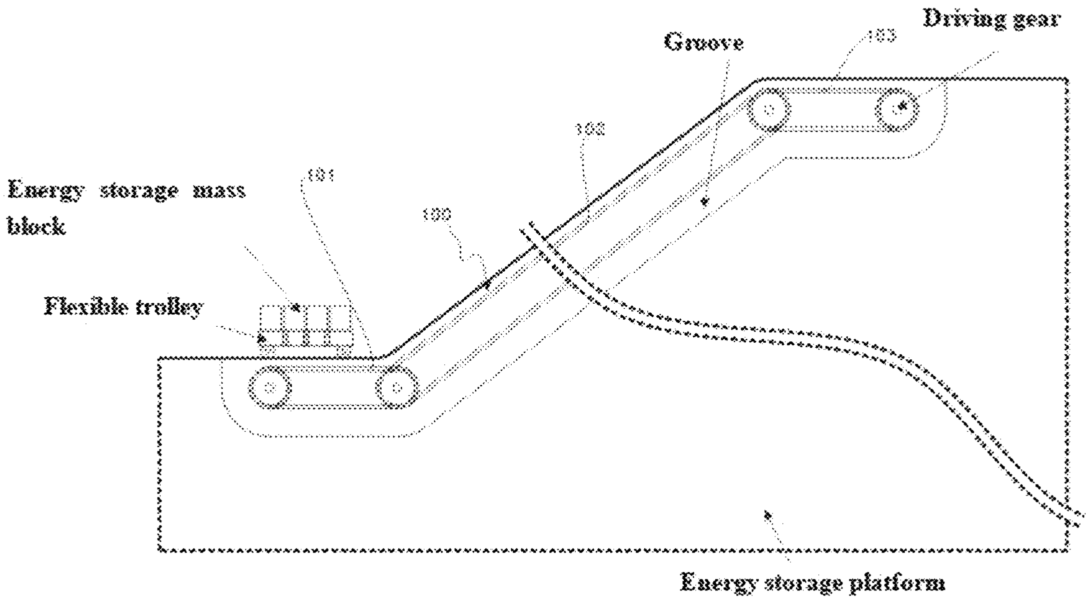
FIG. 1 is a diagram of a chain distribution state of a slope type gravity energy storage transmission device.
Figure 2:
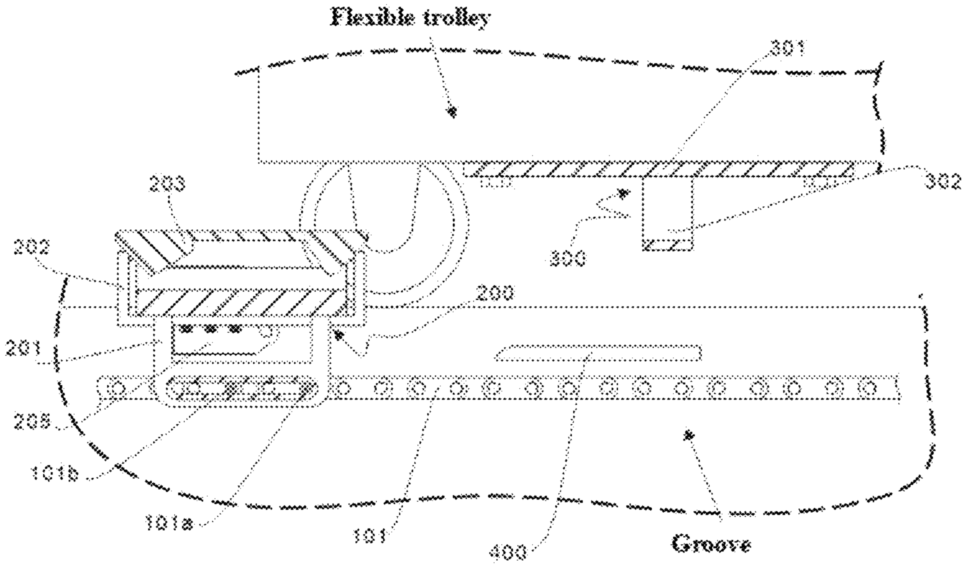
FIG. 2 is a state diagram when a connecting mechanism of a slope type gravity energy storage transmission device moves to a lower gentle area.
Figure 3:
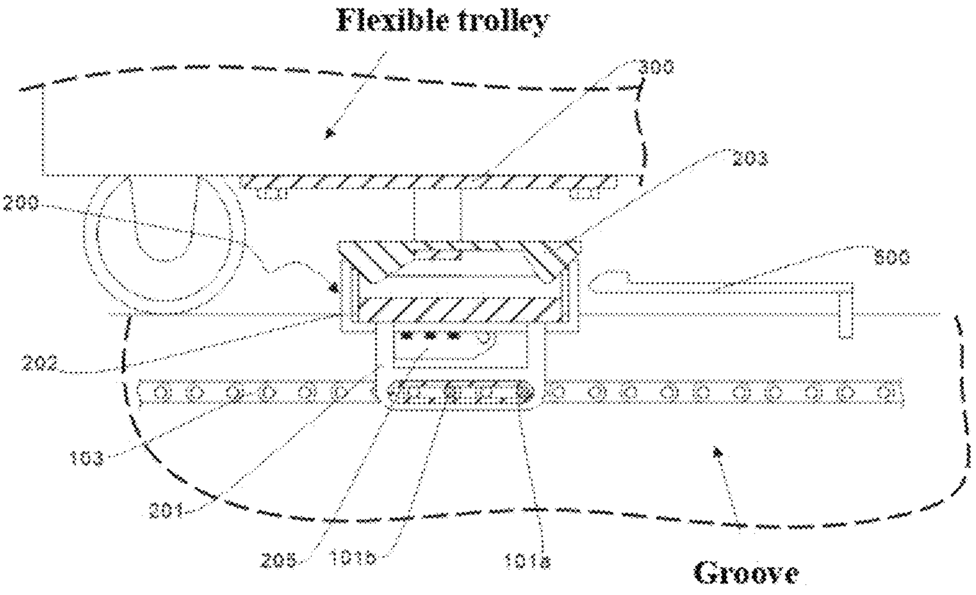
FIG. 3 is a state diagram when a connecting mechanism of a slope type gravity energy storage transmission device moves to an upper gentle area.
Figure 4:
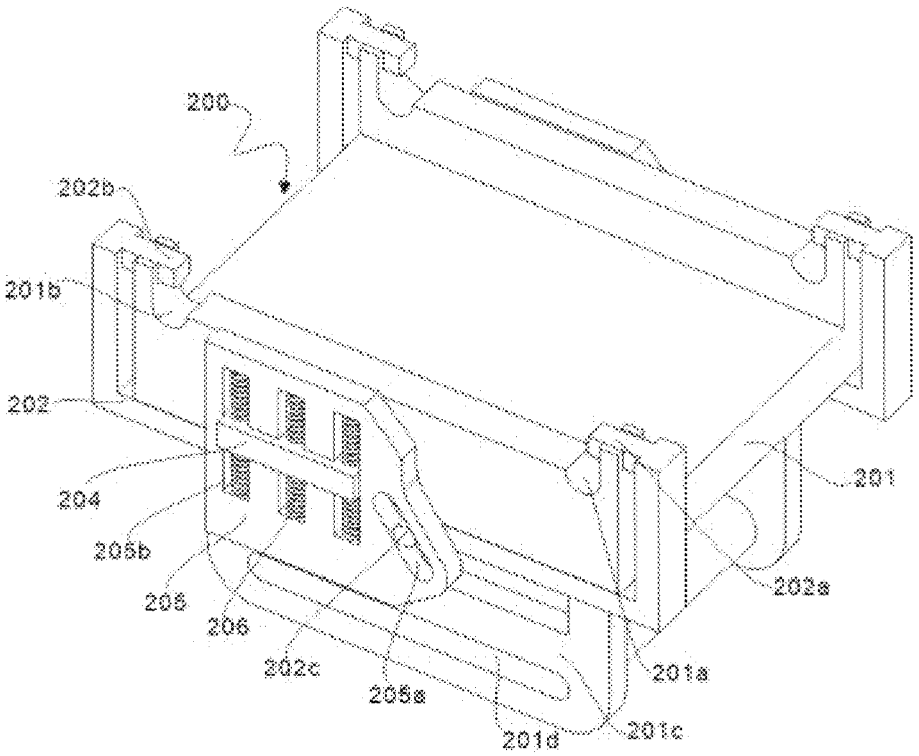
FIG. 4 is a schematic structural diagram of a connecting mechanism of a slope type gravity energy storage transmission device.
Figure 5:
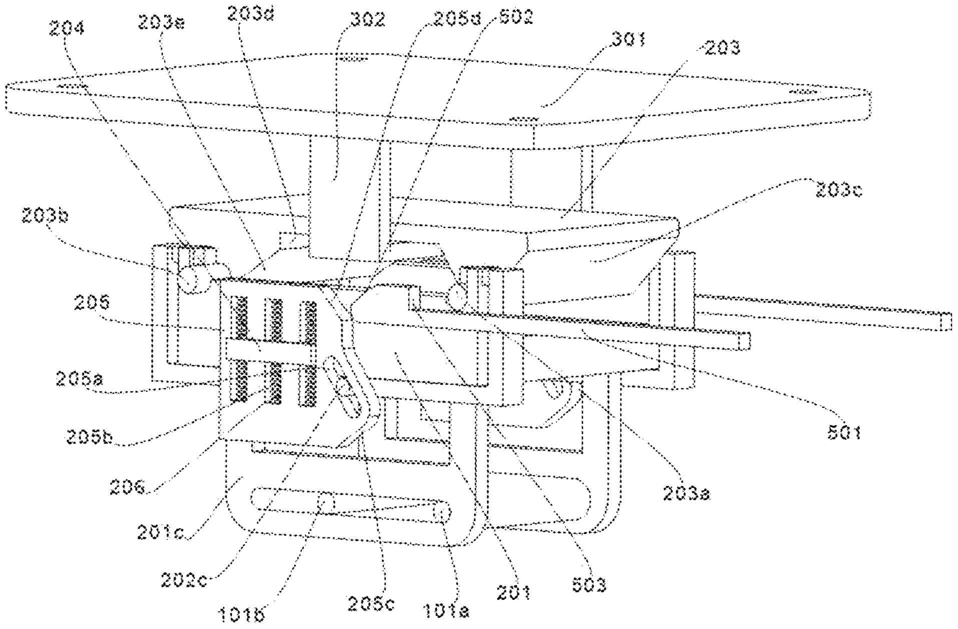
FIG. 5 is a schematic structural diagram when a connecting mechanism and an abutting mechanism of a slope type gravity energy storage transmission device are connected.
Figure 6:
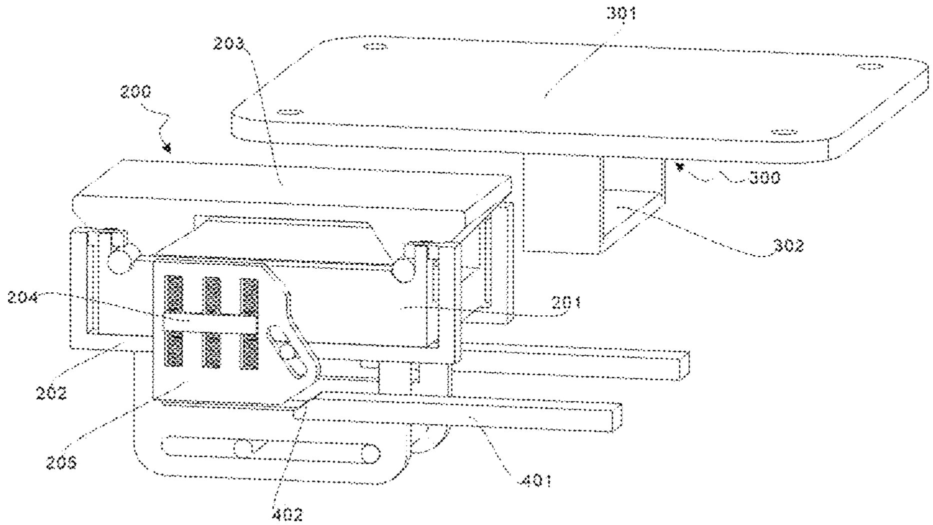
FIG. 6 is a schematic structural diagram when a connecting mechanism and an abutting mechanism of a slope type gravity energy storage transmission device are separated.

Embodiment 1, referring to FIG. 1 to FIG. 6, is a first embodiment of the present invention. This embodiment provides a slope type gravity energy storage transmission device, including: a chain 100, where the chain 100 is provided with a lower gentle area 101, an ascending area 102 and a lower gentle area 103. In this embodiment, the chain 100 is arranged in a groove of an energy storage platform, an auxiliary gear is arranged in the groove, a driving gear for driving the chain 100 to operate is arranged at the top of the groove, the chain 100 forms the lower gentle area 101, the ascending area 102 and the upper gentle area 103 under the action of the auxiliary gear, and the arrangement of the auxiliary gear belongs to the technical means commonly used by those skilled in the art, which will not be elaborated herein. It should be noted that the chain 100 of the lower gentle area 101 and the upper gentle area 103 is in a horizontal state, and the chain 100 of the ascending area 102 is in an inclined state.

The connecting mechanism 200 includes a connecting base 201 arranged on the chain 100 and a locking frame 202 slidingly arranged on the connecting base 201, and further includes a fastening plate 203 movably connected to the connecting base 201. In this embodiment, the fastening plate 203 is clamped on the connecting base 201 through the locking frame 202.

The abutting mechanism 300 includes a fixed plate 301 and an inserting frame 302 arranged on the fixed plate 301. In this embodiment, the fixed plate 301 is used to connect the bottom of a flexible trolley and is inserted into the fastening plate 203 through the inserting frame 302, so that the chain 100 can be connected to the flexible trolley.

It should be noted that the fastening plate 203 is in a locked state when the locking frame 202 does not slide, the fastening plate 203 can deflect rightward when the locking frame 202 slides leftward, the fastening plate 203 can deflect leftward when the locking frame 202 slides rightward, and a deflectable direction of the fastening plate 203 can be controlled by controlling a sliding direction of the locking frame 202.

Specifically, a first semi-arc groove 201*a* and a second semi-arc groove 201*b* are formed in the connecting base 201; a first locking rod 202*a* and a second locking rod 202*b* are arranged on the locking frame 202; and in this embodiment, the first locking rod 202*a* and the first semi-car groove 201*a* are tangent, and the second locking rod 202*b* and the second semi-arc groove 201*b* are tangent.

Preferably, protrusion portions are arranged at two ends of the fastening plate 203, and a first clamping shaft 203*a* and a second clamping shaft 203*b* are arranged on the fastening plate 203. In this embodiment, due to the arrangement of the protrusion portions at the two ends, after the fastening plate 203 deflects, the protrusion portions can increase the weights of the two ends, thereby facilitating resetting through the self-weight; the arrangement of the protrusion portions increases a distance from the first clamping shaft 203*a* and the second clamping shaft 203*b* to a surface of the fastening plate 203, thereby facilitating the insertion of the inserting frame 302; and the first clamping shaft 203*a* is movably connected to the first semi-arc groove 201*a*, and the second clamping groove 203*b* is movably connected to the second semi-arc groove 201*b*.

Further, a first shaft 101*a* and a second shaft 101*b* are arranged on the chain 100; and a connecting frame 201*c* is arranged on the connecting base 201, and a connecting groove 201*d* is formed in the connecting frame 201*c*. In this embodiment, the first shaft 101*a* and the second shaft 101*b* are fixedly arranged on the chain 100, the first shaft 101*a* and the second shaft 101*b* are slidingly arranged in the connecting groove 201*d*, and a length of the connecting groove 201*d* is greater than a distance between the first shaft 101*a* and the second shaft 101*b*. The chain 100 will change in shape during operation, so the first shaft 101*a* and the second shaft 101*b* are connected through the connecting groove 201*d*, and the first shaft 101*a* and the second shaft 101*b* can slide in the connecting groove 201*d*. When the chain 100 bends to change the distance between the first shaft 101*a* and the second shaft 101*b*, the connecting groove 201*d* can provide a moving space for sliding, thereby achieving the connection between the connecting base 201 and the chain 100.

In an initial state, the first locking rod 202*a* and the second locking rod 202*b* clamp the first clamping shaft 203*a* and the second clamping shaft 203*b*, and at this time, the fastening plate 203 cannot deflect.

During use, the chain 100 performs driving through the driving gear, and the chain 100 can drive the connecting mechanism 200 to move; when it is necessary to clamp the trolley, the first locking rod 202*a* slides away from a direction of the second locking rod 202*b* by sliding the locking frame 202; after the first locking rod **202*a* slides, a part above the first clamping shaft 203*a* loses obstruction, and the second clamping shaft 203*b* is kept clamped with the second locking rod 202*b*; at this time, the fastening plate 203 can rotate around the second clamping shaft 203*b* as an axis, so the inserting frame 302 can be inserted between the fastening plate 203 and the connecting base 201; and after the inserting frame 302 is inserted into the fastening plate 203, since the fastening plate 203 is provided with the protrusion portions, the first clamping shaft 203 falls into the first semi-arc groove 201*a* under the action of the gravity, and the locking frame 202 is pushed to rest, so that the first locking rod 202*a* and the second locking rod 202*b* clamp the first clamping shaft 203*a* and the second clamping shaft 203*b* to complete the connection between the abutting mechanism 300 and the connecting mechanism 200**.

The operation of the chain 100 will drive the flexible trolley to move until the flexible trolley is lifted to the top of the energy storage platform, the connecting mechanism 200 moves to the upper gentle area 103, and at this time, it is necessary to disconnect the flexible trolley and the chain 100, so that the first locking rod **202*a* slides in a direction close to the second locking rod 202*b* by sliding the locking frame 202. At this time, the first clamping shaft 203*a* can be clamped through the first locking rod 202*a*, and the second locking rod 202*b* will lose the obstruction on the second clamping shaft 203*b* due to slippage. Therefore, the fastening plate 203 can rotate around the first clamping shaft 203*a* as an axis, and the inserting frame 302 can be separated after the fastening plate 203** rotates.

In conclusion, the inserting frame 302 is clamped by the fastening plate 203, and the separation phenomenon can be avoided when the flexible trolley is lifted, so that the potential safety hazard can be reduced.

Embodiment 2, referring to FIG. 1 to FIG. 6, is a second embodiment of the present invention. Different from the above embodiment, the connecting mechanism 200 further includes a limiting frame 204 fixedly arranged on the connecting base 201, and a side sliding plate 205 slidingly arranged on the limiting frame 204, where an oblique push groove **205*a* and a limiting groove 205*b* are formed in the side sliding plate 205, and a spring 206 is arranged in the limiting groove 205*b*; a push column 202*c* is arranged on the locking frame 202, and an outer wall of the push column 202*c* is slidingly connected to an inner wall of the oblique push groove 205*a*; in this embodiment, the springs 206 are arranged at upper and lower ends of the limiting frame 204; through the arrangement of the springs 206, the push column 202*c* can be kept at a middle part of the oblique push groove 205*a* when the side sliding plate 205 is not stressed; and the locking frame 202 can be pushed to slide when the side sliding plate 205** slides downward or upward.

Specifically, the slope type gravity energy storage transmission device further includes an opening top plate 400; the opening top plate 400 includes a lower top plate 401 and an oblique push surface 402 arranged on the lower top plate 401; a lower abutting surface **205*c* is arranged on the side sliding plate 205; and it is should be noted that the opening top plate 400 is fixedly arranged in the groove at the lower gentle area 101, and the oblique push surface 402 can align with the abutting surface 205*c* when the side sliding plate 205 moves close to the opening top plate 400**.

The slope type gravity energy storage transmission device further includes a separating top rod 500; the separating top rod 500 includes an upper push rod 501 and an upper top surface 502 arranged on the upper push rod 501; an upper abutting surface **205*d* is arranged on the side sliding plate 205; and it should be noted that the separating top rod 500 is fixedly arranged in the groove at the upper gentle area 103, and the upper push rod 501 can abut against the upper abutting surface 205*d* when the side sliding plate 205 moves close to the separating top rod 500**.

Specifically, an upper push surface **203*c* is arranged on the fastening plate 203; a separating surface 203*e* is arranged on the fastening plate 203; and a pushing surface 203*d* is arranged on the fastening plate 203**.

Preferably, a reset groove 503 is formed in the upper push rod 501; and a length of the second clamping shaft **203*b* is greater than that of the first clamping shaft 203*a***.

Other structures are identical to those of Embodiment 1.

The flexible trolley stops above the lower gentle area 101. When the chain 100 moves, the connecting mechanism 200 is close to the opening top plate 400 and the flexible trolley. When the abutting surface **205*c* is in contact with the oblique push surface 402, due to the abutment of the oblique push surface 402 on the lower top plate 401, the side sliding plate 205 slides. When the side sliding plate 205 slides, the locking frame 202 is pushed by the oblique push groove 205*a* to slide, so that the first locking rod 202*a* slides in a direction away from the second locking rod 202*b*, and the fastening plate 203 can rotate around the second clamping shaft 203*b* as an axis. With the movement of the chain 100, the fastening plate 203 will abut against the inserting frame 302. Due to the arrangement of the upper push surface 203*c*, the fastening plate 203 will rotate when being abutted until the inserting frame 302 enters between the fastening plate 203 and the connecting base 201. Under the action of the gravity, the first clamping shaft 203*a* falls into the first semi-arc groove 201*a*. After the chain 100 moves for a certain distance, the lower top plate 401 will lose the abutment with the side sliding plate 205, and the locking frame 202 is reset under the action of an elastic force of the spring 206, so that the fastening plate 203** is locked to achieve the connection with the trolley.

It should be noted that, due to the arrangement of the pushing surface **203*d*, after the fastening plate 203 is reset through the gravity, the inserting frame 302 abuts against the pushing surface 203*d*, and at this time, the inserting frame 302 can be pushed through the pushing surface 203*d***, so that the trolley moves and the contact area is increased.

When the connecting mechanism 200 and the abutting mechanism 300 move to the upper gentle area 103, the movement of the chain 100 enables the upper abutting surface **205*d* to abut against an end part of the upper push rod 501, and the side sliding plate 205 will slide after being abutted, so that the locking frame 202 slides, and the first locking rod 202*a* slides in a direction close to the second locking rod 202*b*. At this time, the first clamping shaft 203*a* can be clamped through the first locking rod 202*a*. The second locking rod 202*a* will lose the obstruction on the second clamping shaft 203*b* due to slippage. With the increase of the movement distance and due to the length of the second clamping shaft 203*b* greater than that of the first clamping shaft 203*a*, the upper top surface 502 will abut against the second clamping shaft 203*b*, and the second clamping shaft 203*b* is pushed through the upper top surface 502, so that the fastening plate 203 performs preliminary deflection, the inserting frame 302 is in contact with the separating surface 203*e*, and the inserting frame 302 will push the fastening plate 203 for further deflection until the inserting frame 302 is separated from the fastening plate 203. Due to the arrangement of the reset groove 503 and the cooperation with the action of the gravity, the second clamping shaft 203*b*** can fall into the second semi-arc groove

201*b*, and the state of the fastening plate 203 is recovered. With the movement of the chain 100, the upper push rod 501 will lose the abutment with the side sliding plate 205, and under the action of the elastic force of the spring 206, the locking frame 202 resets to lock the fastening plate 203.

In conclusion, the connection and automatic separation between the abutting mechanism 300 and the connecting mechanism 200 can be achieved.

It should be noted that the above embodiments are only used to illustrate the technical solution of the present invention and are not for limitation. Although the present invention is described in detail with reference to the preferred embodiments, those of ordinary skill in the art should understand that the technical solutions of the present invention may be modified or replaced by equivalents without departing from the spirit and scope of the technical solutions of the present invention, and all those modifications or replacements should be included in the scope of the claims of the present invention.

What is claimed is:

1. A slope type gravity energy storage transmission device, comprising:

a chain, the chain being provided with a lower horizontal area, an ascending area and an upper horizontal area;

a connecting mechanism, comprising a connecting base arranged on the chain and a locking frame slidingly arranged on the connecting base, and further comprising a fastening plate movably connected to the connecting base; and an abutting mechanism, comprising a fixed plate and an inserting frame arranged on the fixed plate, wherein a deflectable direction of the fastening plate is capable of being controlled by controlling a sliding direction of the locking frame.

2. The slope type gravity energy storage transmission device according to claim 1, wherein a first semi-arc groove and a second semi-arc groove are formed in the connecting base;

a first locking rod and a second locking rod are arranged on the locking frame; and protrusion portions are arranged at two ends of the fastening plate, and a first clamping shaft and a second clamping shaft are arranged on the fastening plate.

3. The slope type gravity energy storage transmission device according to claim 2, wherein the connecting mechanism further comprises a limiting frame fixedly arranged on the connecting base and a side sliding plate slidingly arranged on the limiting frame, an oblique push groove and a limiting groove being formed in the side sliding plate, and a spring being arranged in the limiting groove; and a push column is arranged on the locking frame, and an outer wall of the push column is slidingly connected to an inner wall of the oblique push groove.

4. The slope type gravity energy storage transmission device according to claim 3, further comprising an opening top plate, wherein the opening top plate comprises a lower top plate and an oblique push surface arranged on the lower top plate; and a lower abutting surface is arranged on the side sliding plate.

5. The slope type gravity energy storage transmission device according to claim 4, further comprising a separating top rod, wherein the separating top rod comprises an upper push rod and an upper top surface arranged on the upper push rod; and an upper abutting surface is arranged on the side sliding plate.

6. The slope type gravity energy storage transmission device according to claim 5, wherein an upper push surface is arranged on the fastening plate.

7. The slope type gravity energy storage transmission device according to claim 6, wherein a separating surface is arranged on the fastening plate.

8. The slope type gravity energy storage transmission device according to claim 7, wherein a pushing surface is arranged on the fastening plate.

9. The slope type gravity energy storage transmission device according to claim 8, wherein a reset groove is formed in the upper push rod; and a length of the second clamping shaft is greater than that of the first clamping shaft.

10. The slope type gravity energy storage transmission device according to claim 1, wherein a first shaft and a second shaft are arranged on the chain;

a connecting frame is arranged on the connecting base, and a connecting groove is formed in the connecting frame; and the first shaft and the second shaft are slidingly arranged in the connecting groove.

* * * * *